United States Patent [19]
Yoshida et al.

[11] Patent Number: 4,918,443
[45] Date of Patent: Apr. 17, 1990

[54] METHOD FOR DETERMINING A ROTATIONAL ANGLE OF A ROTARY BODY

[75] Inventors: Yukio Yoshida, Namerikawa; Akiyoshi Takimoto, Toyama; Shigenobu Murai, Uozu, all of Japan

[73] Assignee: Yoshida Kogyo K. K., Tokyo, Japan

[21] Appl. No.: 403,795

[22] Filed: Sep. 5, 1989

Related U.S. Application Data

[63] Continuation of Ser. No. 133,424, Dec. 15, 1987, abandoned.

[30] Foreign Application Priority Data

Dec. 16, 1986 [JP] Japan .................................. 61-297750

[51] Int. Cl.$^4$ ............................................. H03M 1/24
[52] U.S. Cl. ......................................... 341/6; 318/603
[58] Field of Search .................. 318/603; 341/1, 6, 13

[56] References Cited

U.S. PATENT DOCUMENTS

| 4,442,532 | 4/1984 | Takemura | 340/347 P |
| 4,587,513 | 5/1986 | Burrowes et al. | 340/347 P |

FOREIGN PATENT DOCUMENTS 61-115482 7/1986 Japan .
1173293 12/1969 United Kingdom .
1343801 1/1974 United Kingdom .

Primary Examiner—William M. Shoop, Jr.
Assistant Examiner—Marc S. Hoff
Attorney, Agent, or Firm—Hill, Van Santen, Steadman & Simpson

[57] ABSTRACT

For the purpose of knowing an angular position and a rotational speed of a rotary body, according to an encoding pattern on an encoder mounted to and synchronously rotated with the rotary body, rotational angular position signals consisting of n-phase rectangular waves and sensing pulses occurring at a predetermined rotational angle interval are generated. In response to the issue of each sensing pulse, levels of the respective rotational angular position signals are detected, a variation pattern of a combination of the detected n levels is compared with a reference variation pattern, and it is determined whether an abnormal condition has arisen or not, and if the condition is normal, whether the variation pattern is a forward traveling pattern or a backward traveling pattern. In the case of the forward traveling pattern, (+1) is added to a rotational angle counter, while in the case of the backward traveling pattern, (−1) is added to the rotational angle counter.

3 Claims, 2 Drawing Sheets

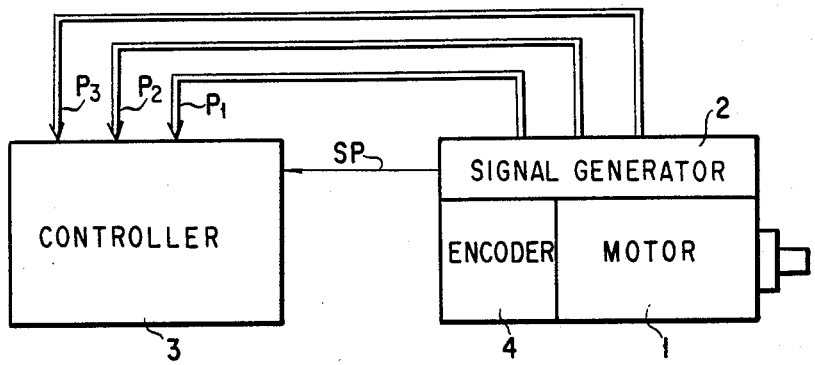
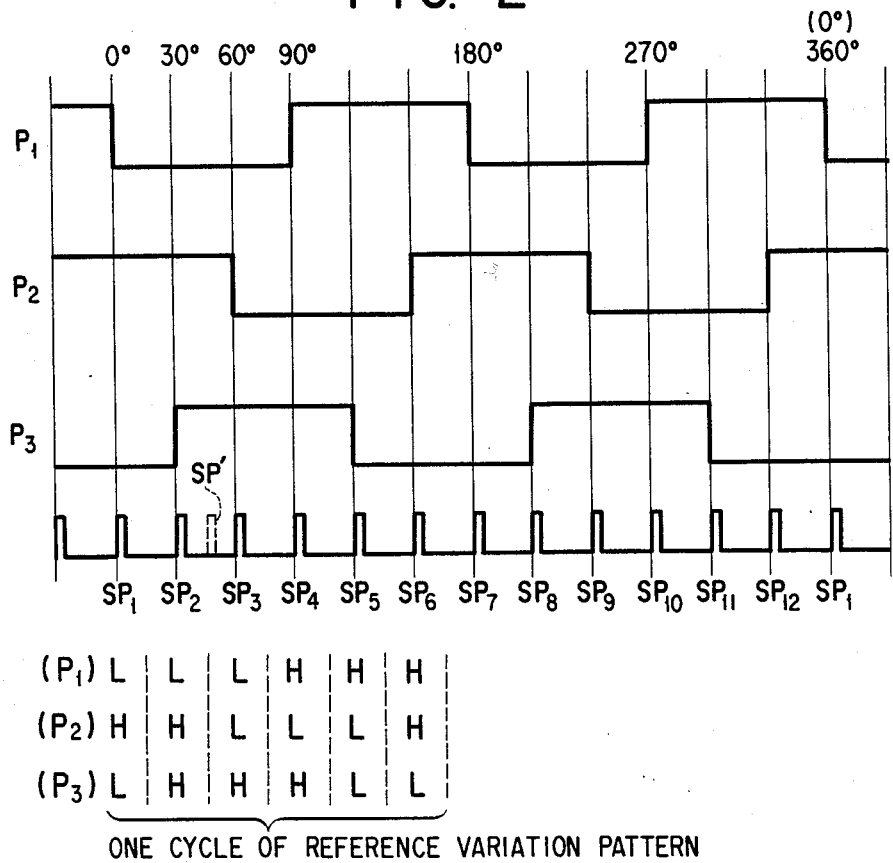

METHOD FOR DETERMINING A ROTATIONAL ANGLE OF A ROTARY BODY

This is a continuation of application Ser. No. 133,424, filed 12/15/87.

BACKGROUND OF THE INVENTION

1. Field of the Invention

This invention relates to a method for determining a rotational angle of a rotary body, and more particularly to an improved method for determining a rotational angle of a rotor of an AC motor or a DC motor which drives a door in an automatic door system in order to control the rotation of the motor.

2. Description of the Prior Art

In an automatic door system, a belt is wound around a drive pulley that is driven by an AC motor or a DC motor and a driven pulley, a door is connected to this belt, and opening and closing operations of the door is effected by normally or reversely rotating the door.

In order to control opening and closing of a door in such an automatic door system according to a desired operation mode, provision must be made such that a position and a speed (positive or negative) of the door can be always detected. In a heretofore known automatic door system, in accordance with rotation of an encoder mounted to a rotor of a motor, sensing pulses are generated at a predetermined rotational angle interval, and by count up or count down the number of these sensing pulses depending upon a direction of rotation, a moved distance of a door and hence a position of a door with reference to a given position (for instance, a closing-stop position of a door) could be known, and a moving speed of a door could be detected on the basis of a repitition cycle of these sensing pulses.

However, in such a method there is a possibility of malfunction such that in a pulse series of sensing pulses generated by rotation of an encoder upon rotation of a motor for driving a door, one pulse may drop out or one pulse is excessively added due to electrical or mechanical faults. In such cases, errors would arise in the detected position or moving speed of the door, and so it becomes impossible to precisely control opening and closing of a door in an automatic door system according to a desired operation mode.

This is not limited to an automatic door system, but the situation is also the same in operation control of other instruments driven by a motor, and more generally, this is a problem common to methods for detecting a rotational angle or a rotational speed of a rotary body by means of sensing pulses as described above.

SUMMARY OF THE INVENTION

The present invention has been made in view of the foregoing circumstances, and its aim is to provide an improved method for determining a rotational angle of a rotary body, in which errors would not occur in detection of a rotational angular position or a rotational speed of a rotary body in the case where a surplus pulse has been added or drop-out of a pulse has occurred in a series of sensing pulses generated according to rotation of an encoder.

In order to achieve the above described aim, according to one aspect of the present invention, there is provided a method for determining a rotational angle of a rotary body, consisting of the steps of generating n-phase rotational angular position signals formed in rect- angular waves, respectively, which alternately repeat a high level and a low level at an interval equal to n times a predetermined rotational angle interval which is an even number ($2m$) fraction of 360 degrees, wherein m is an integer and n is a diviser larger than unity of m, and which are phase-shifted by the predetermined rotational angle interval with respect to one another according to an encoding pattern on an encoder rotating synchronously with the rotary body and also generating sensing pulses at the predetermined rotational angle interval just behind the respective level changes of the rotational angular position signals, detecting the respective levels of the n-phase rotational angular position signals in response to the issue of the sensing pulse, comparing a variation pattern of a combination of detected n levels with a reference variation pattern and, if they do not coincide with each other, generating an abnormal alarm signal, discriminating whether the variation pattern is a forward traveling pattern or a backward traveling pattern if the both variation patterns coincide with each other as a result of the comparison, and adding ($+1$) to a rotational angle counter if the variation pattern is a forward traveling pattern or adding ($-1$) to the rotational angle counter if the variation pattern is a backward traveling pattern.

According to the present invention, since the sensing pulses generated according to an encoding pattern on an encoder are not simply accumulated as is the case with the prior art, but the accumulation of the sensing pulses for evaluating a rotational angle is effected only in the case where it has been checked by means of n-phase rotational angular position signals whether or not the sensing pulses are pulses generated conectly at a predetermined rotational angle interval and they have been proved to be correct sensing pulses, errors would not arise in the detected rotational angle and rotational speed of the rotary body.

In the event that a faulty sensing pulse has been detected or drop-out of a sensing pulse has been detected, an abnormal alarm signal is generated and control is interrupted so as to avoid malfunction. But even in such cases, if necessary, it is possible to add a subsequent sensing pulse or eliminate a subsequent sensing pulse in response to the abnormal alarm signal for continuing correct control.

The above-mentioned and other objects, features and advantages of the present invention will become more apparent by reference to the following description of one preferred embodiment of the invention taken in conjunction with the accompanying drawings.

BRIEF DESCRIPTION OF THE DRAWINGS

In the accompanying drawings:

FIG. 1 is a block diagram of an apparatus for performing determination of a rotational angle of a motor by practicing the method according to the present invention;

FIG. 2 is a diagram showing, as a function of a rotational angle, sensing pulses and 3-phase rotational angular position signals being out of phase at a predetermined rotational angle to one another which are generated by a signal generator according to an encoding pattern on an encoder.

DETAILED DESCRIPTION OF THE PREFERRED EMBODIMENT

Figure 3:
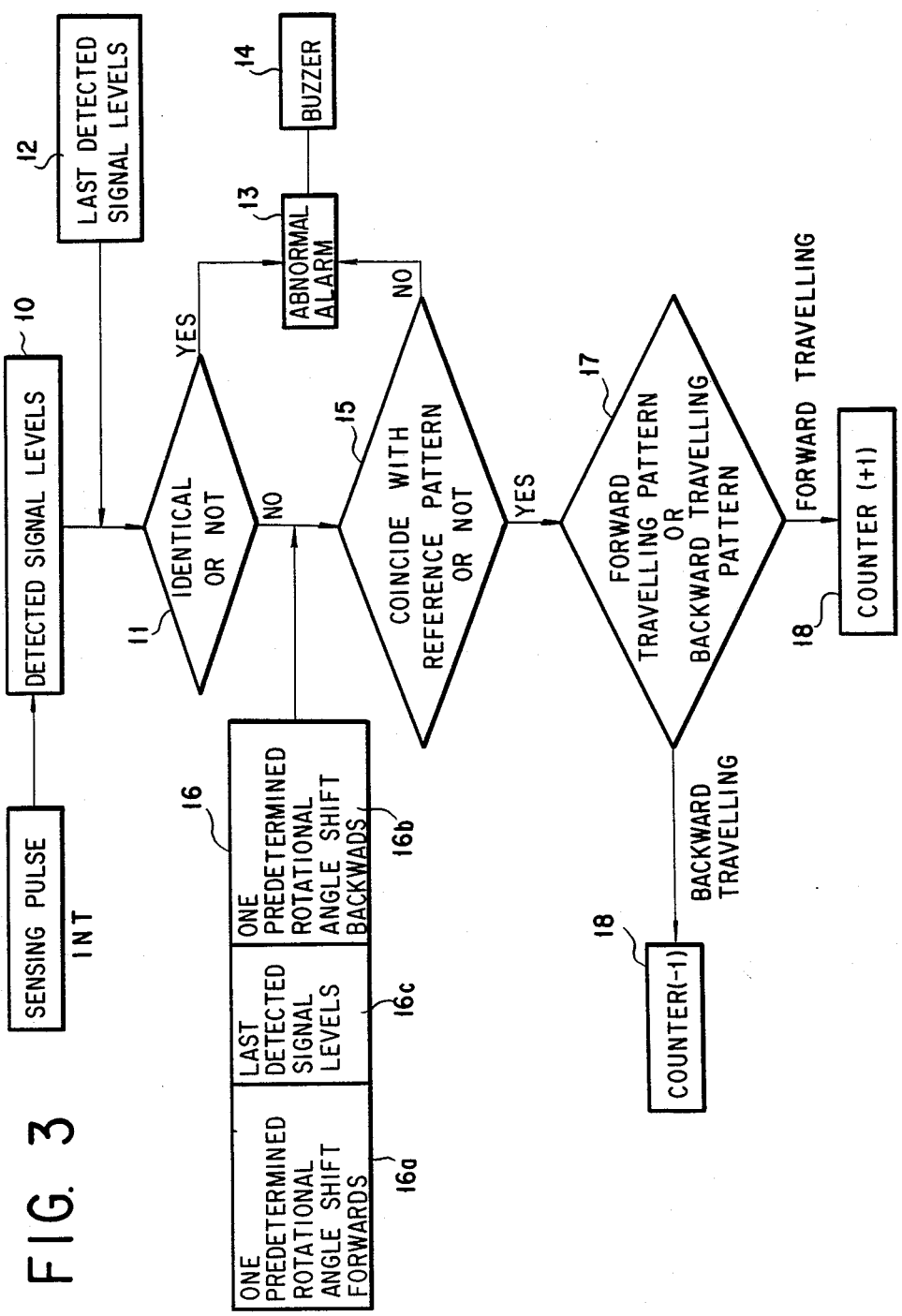
FIG. 3 is a flow chart representing logical operations executed for the sensing pulses and the 3-phase rotational angular position signals in a controller shown in FIG. 1.

In FIG. 1, a known encoder 4 which is, for example, disc-shaped is integrally mounted to and synchronously rotated with a rotor of an AC motor or a DC motor 1 serving as a drive source for performing, for instance, opening and closing operations of a door in an automatic door system, and when the rotor rotates, 3-phase rotational angular position signals P1, P2 and P3 (See FIG. 2) being out of phase at a predetermined rotational angle to one another and sensing pulse series SP are generated by an optical or magnetic signal generator 2 opposed to a circumferential portion of an encoder 4 according to an optical or magnetic encoding pattern preset along the circumference of the encoder. These three-phase rotational angular position signals P1, P2 and P3 and sensing pulse series SP are transmitted from the signal generator 2 to a controller 3, where the pulse series and the signals are subjected to logical operations as will be explained in the following.

As shown in FIG. 2 in the form of a waveform diagram taking a rotational angle of the encoder 4 along an abscissa, the 3-phase rotational angular position signals P1, P2 and P3 consist of 3-phase rectangular waves, which alternately repeat a high level (hereinafter called simply H-level) and a low level (hereinafter called simply L-level) at an interval of 90° that is equal to three times 30° corresponding to the rotational angle interval of the sensing pulses, and which are phase-shifted by 30° with respect one another. Of course, a repetition frequency of these rectangular waves also becomes high as the rotational speed of the encoder 4 is increased, but the relationship between the rotational angular position of the encoder and the output levels of the three signals is always fixed independently of the rotational speed, as indicated in FIG. 2.

More particularly, in one revolution (=360°) of the encoder 4, the first phase rotational angular position signal P1 is a rectangular wave signal which has an H-level in the intervals of 90°~180° and 270°~360° and an L-level in the intervals of 0°~90° and 180° 270°, the second phase rotational angular position signal P2 is a rectangular wave signal which has an H-level in the intervals of 150°~240° and 330°~60° and an L-level in the intervals of 60°~150° and 240°~330°, and the third phase rotational angular position signal P3 is a rectangular wave signal which takes H-level in the intervals of 30°~120° and 210°~300° and an L-level in the intervals of 120°~210° and 300°~30°.

On the other hand, the sensing pulse series SP is a pulse series consisting of narrow sensing pulses SP1, SP2, SP3, generated, in the case of the illustrated embodiment, at an interval of 30° which is one 12-th of one revolution (=360°) of the encoder 4, and a repetition frequency of this pulse series becomes high as the rotational speed of the rotor, and hence, of the encoder 4 in increased.

Now, the logical operations for precisely determining the rotational angular position of the encoder 4 by means of the above-described sensing pulse series SP and the 3-phase rotational angular position signals P1, P2 and P3 in the controller 3, will be explained with reference to the flow chart in FIG. 3.

At first, the sensing pulses SP1, SP2, SP3, are generated, in turn, just behind the respective level changes of the 3-phase rotational angular position signals P1, P2 and P3 so that the levels of the respective ones of the 3-phase rotational angular position signals P1, P2 and P3 can be detected (FIG. 3: 10). If the signal generator 2 correctly generates these rotational angle position signals P1, P2 and P3 and the sensing pulse series SP according to an encoding pattern preset on the encoder 4, and if they are not disturbed during the period when they are transmitted to the controller 3, then as indicated at the bottom of FIG. 2, the combination of the levels of the rotational angular position signals P1, P2 and P3 detected in response to each of the sensing pulses SP1, SP2, SP3, . . . must be cyclically varied according to the following variation pattern (I) (this being called "reference variation pattern"):

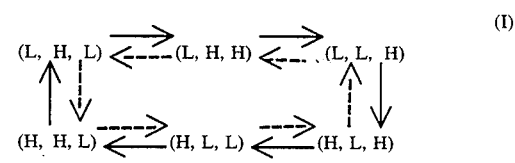
(I)

(wherein it is a matter of course that if the motor is reversed in rotation and the encoder 4 rotates in the reversed direction, the level combination would be cyclically varied according to a reversed pattern as indicated by dotted line arrows).

As a first step of checking whether or not these signals P1, P2 and P3 and the sensing pulse series SP are correct ones, a combination of signal levels detected by the last sensing pulse and a combination of signal levels detected by the present sensing pulse are compared with each other, and it is determined whether or not they are identical to each other (FIG. 3: 11, 12). As will be apparent from the above-mentioned reference variation pattern, naturally these two level combinations should be different from each other, and if they are identical, it should be determined that malfunction has occurred due to any fault. For instance, if it is assumed that the last sensing pulse was SP2, then the combination of the signal levels detected in response to that sensing pulse is (L, H, H). In the event that the pulse deemed as the present sensing pulse is not correctly the next sensing pulse SP2 but a pulse SP' (indicated by a dotted line in FIG. 2) mixed as a result of noise, the combination of the signal levels now detected in response to this noise pulse SP' is also (L, H, H), and so, as a result of comparison, it is determined that the both level combinations are identical. Therefore, in the event that it is determined that they are identical, an abnormal alarm signal is generated (FIG. 3: 13), and consequently a buzzer is made to sound (FIG. 3: 14).

In the event that it has been determined that the present combination of the detected levels and the last combination of the detected levels are different from each other, the checking operation proceeds to a second step. In the second checking step, a level combination derived by shifting the last detected level combination (FIG. 3: 16c) by one predetermined rotational angle (30°) forwards according to the reference variation pattern (FIG. 3: 16a), that is, (L, L, H), if the last combination is (L, H, H), and a level combination derived by shifting the last detected level combination (FIG. 3: 16c) by one predetermined rotational angle (30°) backwards according to the reference variation pattern (FIG. 3: 16b), that is, (L, H, L), if the last combination is (L, H, H), are respectively compared with the now detected level combination (FIG. 3: 15). As a result, if the now detected level combination coincides with either one of the above-described two combinations (L, L, H) and (L, H, L), it is known that the sensing pulse series SP and the 3-phase rotational angular position signals P1, P2 and P3 are being correctly transmitted to the controller 3. On the contrary, if the now detected level combination does not coincide with either one of the above-mentioned two combinations, it should be determined that malfunction has occurred due to any fault. For instance, in the case where the last sensing pulse was SP2 and the combination of the signal levels detected in response to that sensing pulse is (L, H, H), if it is assumed that the next sensing pulse SP3 has dropped out due to any circuit fault, then the now observed sensing pulse corresponds to the sensing pulse SP4 that is located one pulse interval beyound the sensing pulse SP3, and according, the combination of the signal levels detected in response to that sensing pulse would be (H, L, H). This level combination is determined not to coincide with either one of the above-described contrasts of comparison (L, L, H) and (L, H, L). Therefore, in the event that a presently detected level combination does not coincide with either one of the above-mentioned two combinations (L, L, H) and (L, H, L) and hence it has been determined that the detected level combination does not coincide with the reference variation pattern, an abnormal alarm signal is generated (FIG. 3: 13), and consequently, a buzzer is made to sound (FIG. 3: 14).

Further, in a third step of the checking for the combination of the detected levels of the rotational angular-position signals P1, P2 and P3, in the event that the presently detected level combination coincides with the reference variation pattern, it is determined whether the presently detected level combination is identical to a level combination (L, L, H) derived by shifting the last detected level combination (L, H, H) by one predetermined rotational angle (30°) forwards according to the reference variation pattern or a level combination (L, H, L) derived by shifting the same by one predetermined rotational angle (30°) backwards (FIG. 3: 17). In the former case, since the combination of the signal levels is varying according to the reference variation pattern of forward traveling (solid line arrows shown in the foregoing pattern (I)), it is determined that the encoder 4 (motor 1) is rotating in the normal direction, and so, (+1) is added to a rotational angle counter equipped in the controller 3 so as to count up by one predetermined rotational angle (30°). In the latter case, it is determined that the encoder 4 (motor 1) is rotating in the reverse direction, and so, (−1) is added to the rotational angle counter so as to count down by one predetermined rotational angle (30°).

If the above-mentioned operations are effected, in the rotational angle counter is always reserved an accumulated value of a rotational angle taking 30° as one unit, and a positive or negative rotational speed of the encoder 4 can be also known from the repetition frequency of the count pulses for counting up or counting down in this rotational angle counter.

It is to be noted that while the sensing pulses are generated, by way of example, at an interval of 30° that is equal to one 12-th of one revolution (=360°), and as the rotational angular position signals, 3-phase rectangular wave signals which alternately repeat H-level and L-level at an interval of 90° that is three times the predetermined rotational angular interval of the sensing pulses and which are phase-shifted by 30° with respect to one another are generated in the above-described preferred embodiment, generally, if the predetermined rotational angular interval of the sensing pulses is selected to be an even number (2m) fraction of 360°, and as the rotational angular position signals, n-phase rectangular wave signals which alternately repeat H-level and L-level at an interval equal to n times the predetermined rotational angular interval of the sensing pulses (n being a diviser larger than unit of m) and which are phase-shifted by with respect to one another, are generated, then determination of a rotational angle and a rotational speed of the encoder 4 can be effected in a similar manner to the above-described embodiment, as will be obvious for those skilled in the art. It will be also apparent that as the predetermined rotational angular interval of the sensing pulses is decreased by selecting the above-referred integer m larger, finer determination and control of the angular position can be achieved.

If the case where the predetermined rotational angular interval of the sensing pulse is 30°, in another more simplified embodiment, 2-phase rectangular wave signals which alternately repeat H-level and L-level at an interval of 60° and which are phase-shifted by 30° can be employed as the rotational angular position signals by selecting n=2. In this case, a reference variation pattern for the combination of the signal levels is as follows:

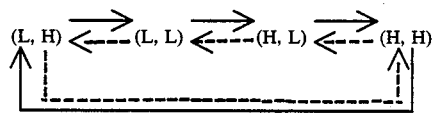

While a principle of the present invention has been described above in connection to one preferred embodiment of the invention, all matter contained in the above description and shown in the accompanying drawings shall be interpreted to be illustrative and not in a limiting sense.

What is claimed is:

1. A method of determining a rotational position of a rotary body; consisting of the steps of generating n-phase rotational angular position signals formed in rectangular waves, respectively, which alternately repeat a high level and a low level at an interval equal to n times a predetermined rotational angle interval which is an even number (2m) fraction of 360 degrees, wherein m is an integer and n is a division larger than unity of m, and which are phase-shifted by said predetermined rotational angle interval with respect to one another, according to an encoding pattern on an encoder rotating synchronously with said rotary body and also generating sensing pulses at the predetermined rotational angle interval just behind the respective level changes of the rotational angular position signals; detecting the respective levels of said n-phase rotational angular position signals in response to the issue of the sensing pulse; comparing a variation pattern of a combination of detected n levels with a reference variation pattern and, if they do not coincide with each other, generating an abnormal alarm signal; discrimating whether said variation pattern is a forward traveling pattern or a backward traveling pattern, if said both variation patterns coincide with each other as a result of the comparison; and adding (+1) to a position counter if said variation pattern is a forward traveling pattern, or adding (−1) to the position counter if said variation pattern is a backward traveling pattern.

2. A method of determining a rotational position of a rotary body as claimed in claim 1, wherein said comparing step further comprises a step of comparing a variation pattern of a combination of detected n levels with a previously stored variation pattern of a combination of last detected n levels and, if they are identical with each other, generating an abnormal alarm signal.

3. A method of determining a rotational position of a rotary body as claimed in claim 1, wherein said sensing pulses are generated at an interval of 30 degrees (m=6) of the rotation of said encoder, and 3-phase rectangular wave signals which alternately take a high level and a low level at an interval of 90 degrees that is three times 30 degrees and which are phase-shifted by 30 degrees with respect to one another, are generated as rotational angular position signals.

* * * * *